(12) United States Patent
Kanno (10) Patent No.: US 10,251,136 B2
(45) Date of Patent: Apr. 2, 2019

(54) CONTROLLING TRANSMIT POWER BASED ON TRANSMITTER TEMPERATURE SENSOR

(71) Applicant: SONY MOBILE COMMUNICATIONS INC., Tokyo (JP)

(72) Inventor: Manabu Kanno, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 15/592,232

(22) Filed: May 11, 2017

(65) Prior Publication Data

US 2018/0007638 A1    Jan. 4, 2018

(30) Foreign Application Priority Data

Jul. 1, 2016    (JP) .................................. 2016-131429

(51) Int. Cl.
| | |
|---|---|
| *H04W 52/18* | (2009.01) |
| *H04W 52/28* | (2009.01) |
| *H04W 52/36* | (2009.01) |
| *H04W 52/26* | (2009.01) |
| *H04W 52/52* | (2009.01) |

(52) U.S. Cl.
CPC ........... *H04W 52/28* (2013.01); *H04W 52/18* (2013.01); *H04W 52/367* (2013.01); *H04W 52/267* (2013.01); *H04W 52/52* (2013.01)

(58) Field of Classification Search
CPC ... H04W 52/18; H04W 52/267; H04W 52/36; H04W 52/28; H04W 52/52; H04W 52/367; H04B 1/0475
USPC .................................... 455/522, 115.1, 127.1
See application file for complete search history.

(56) References Cited

U.S. PATENT DOCUMENTS

| | | | |
|---|---|---|---|
| 2008/0007192 A1* | 1/2008 | Williams | H03G 3/3042 318/471 |
| 2008/0194215 A1* | 8/2008 | Bolanos | H04W 52/223 455/115.1 |
| 2010/0285828 A1* | 11/2010 | Panian | H04W 52/146 455/522 |
| 2014/0091624 A1* | 4/2014 | Park | G05F 3/08 307/31 |

FOREIGN PATENT DOCUMENTS

JP    2014-183454    9/2014

* cited by examiner

*Primary Examiner* — Philip Sobutka
(74) *Attorney, Agent, or Firm* — XSENSUS LLP (57) ABSTRACT

There is provided a control device, including: a control unit that controls a transmit power of a transmission device, on a basis of a temperature acquired by a sensor provided in the transmission device. The transmit power varies depending on the temperature.

4 Claims, 7 Drawing Sheets

CONTROLLING TRANSMIT POWER BASED ON TRANSMITTER TEMPERATURE SENSOR

CROSS REFERENCE TO RELATED APPLICATIONS

This application claims the benefit of Japanese Priority Patent Application JP 2016-131429 filed Jul. 1, 2016, the entire contents of which are incorporated herein by reference.

BACKGROUND

The present disclosure relates to a control device, a control method, and a program.

Recently, there has been strong demand from users for improved communication speed on the Internet, and communication speed is also improving in wireless communication technologies such as wireless local area network (LAN). Since speed improvements in wireless communication technologies are realized primarily by measures that demand high distortion performance, such as increasing the number of modulation symbols, widening the bandwidth, reducing the error correction code rate, or reducing the guard interval, at high data rates enabling fast communication, the communication range decreases in some cases.

To address this point, JP 2014-183454A discloses technology enabling communication at the maximum communication range for each data rate by communicating with a large transmit power at a low data rate in which the desired distortion performance is low, and communicating with a small transmit power at a high data rate in which the desired distortion performance is high.

SUMMARY

Since a wireless communication device may have degraded distortion performance at high temperatures compared to normal temperatures in some cases, in the technology described in JP 2014-183454A, over the entire temperature range, communication is conducted at a transmit power able to guarantee the desired distortion performance at high temperatures. In other words, with the technology described in JP 2014-183454A, since a fixed transmit power is used over the entire temperature range, the transmit power at normal temperatures which is frequently used may become limited, for example.

Accordingly, there is demand for technology enabling more flexible control of the transmit power.

According to an embodiment of the present disclosure, there is provided a control device, including: a control unit that controls a transmit power of a transmission device, on a basis of a temperature acquired by a sensor provided in the transmission device. The transmit power varies depending on the temperature.

Further, according to an embodiment of the present disclosure, there is provided a control method, including: controlling a transmit power of a transmission device, on a basis of a temperature acquired by a sensor provided in the transmission device. The transmit power varies depending on the temperature.

Further, according to an embodiment of the present disclosure, there is provided a program causing a computer to realize: a function of controlling a transmit power of a transmission device on a basis of a temperature acquired by a sensor provided in the transmission device, so that the transmit power of the transmission device varies depending on the temperature.

According to an embodiment of the present disclosure as described above, more flexible control of the transmit power is possible.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

«1. Background»
«2. Configuration»
<2-1. Configuration of wireless communication system>
<2-2. Configuration of wireless terminal>
«3. Operation»
«4. Modifications»
<4-1. Modification 1>
<4-2. Modification 2>
«5. Exemplary hardware configuration»
«6. Conclusion»

«1. Background»

Before describing a wireless communication system according to an embodiment of the present disclosure, first, the background that led to the creation of a wireless communication system according to an embodiment of the present disclosure will be described.

In a wireless communication technology such as wireless LAN, to improve the communication speed, measures such as increasing the number of modulation symbols, widening the bandwidth, reducing the error correction code rate, and reducing the guard interval are conducted. Since measures to improve the communication speed like the above demand high distortion performance, at high data rates enabling fast communication, there is a risk that the communication range may decrease.

On the other hand, like in JP 2014-183454A described above, it is also possible to communicate at the maximum communication range for each data rate by communicating with a large transmit power at a low data rate in which the desired distortion performance is low, and communicating with a small transmit power at a high data rate in which the desired distortion performance is high.

Also, since a wireless communication device may have degraded distortion performance at high temperatures compared to normal temperatures in some cases, in the technology described in JP 2014-183454A, over the entire temperature range, communication is conducted at a transmit power able to guarantee the desired distortion performance at high temperatures. Hereinafter, such technology that conducts communication at a transmit power able to guarantee the desired distortion performance at high temperatures over the entire temperature range is designated the comparative technology according to the present embodiment, and may also be called simply the comparative technology in some cases.

Generally, due to factors such as the characteristics of the power amplifier used in the wireless communication device, the maximum transmit power at which transmission is possible (hereinafter called the saturation transmit power) differs depending on the temperature, and the higher the temperature, the smaller the saturated transmit power. Additionally, the maximum transmit power able to guarantee the desired distortion performance may be specified by subtracting a power margin corresponding to the transmit data rate from the saturated transmit power, for example. In other words, the maximum transmit power able to guarantee the desired distortion performance at a normal temperature is greater than the maximum transmit power able to guarantee the desired distortion performance at a higher temperature. However, in the comparative technology as described earlier, since a fixed transmit power is used over the entire temperature range, the transmit power at normal temperatures which is frequently used may become limited, for example, and there is a risk of decreased communication range.

Figure 1:
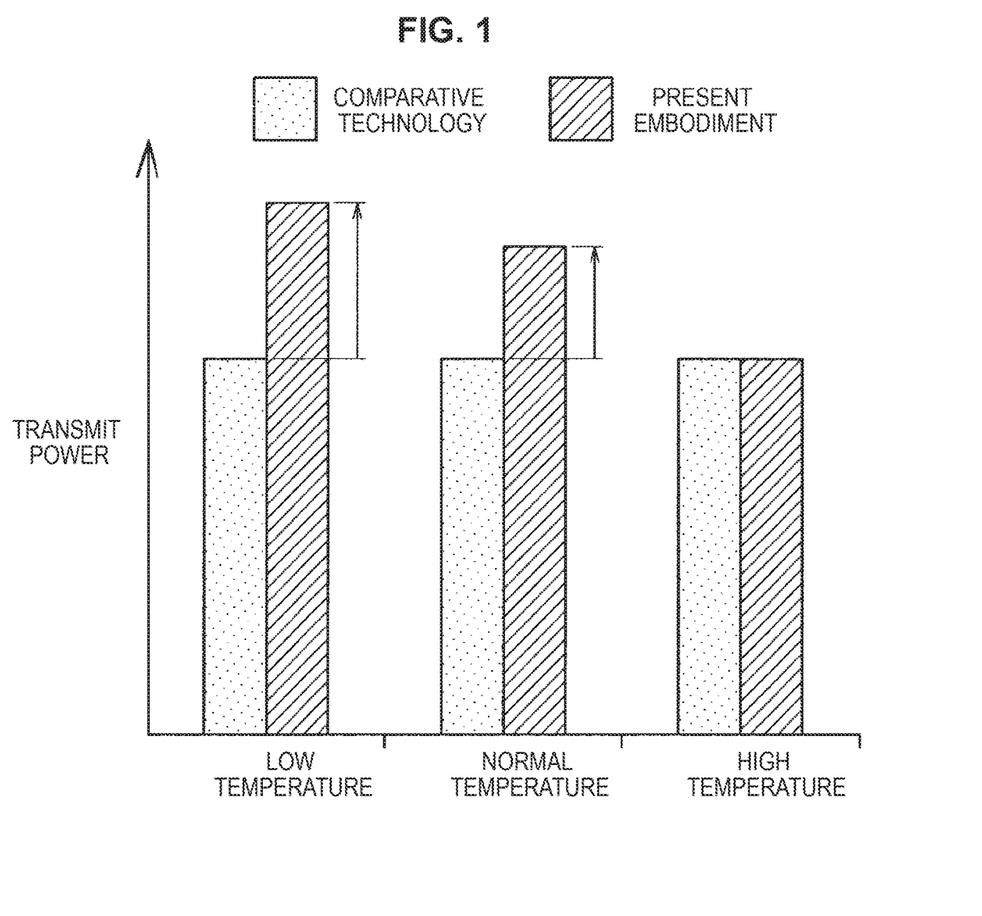
FIG. 1 is an explanatory diagram that schematically illustrates the transmit power in a comparative technology according to an embodiment of the present disclosure and the transmit power in the embodiment.

Accordingly, focusing on the above circumstances led to the creation of the present embodiment. According to the present embodiment, by controlling the transmit power more flexibly, it becomes possible to improve the transmit power at normal temperatures, for example. FIG. 1 is an explanatory diagram that schematically illustrates the transmit power in the comparative technology according to the present embodiment and the transmit power in the present embodiment.

As illustrated in FIG. 1, in the comparative technology, communication is conducted at a fixed transmit power over the entire temperature range. On the other hand, according to the present embodiment, at normal temperatures as well as low temperatures, it is possible to communicate at a greater transmit power than the comparative technology. Also, according to the present embodiment, at high temperatures, it is also possible to conduct communication at a transmit power able to guarantee the desired distortion performance, similarly to the comparative technology.

Hereinafter, the configuration and operation of a wireless communication system according to the present embodiment having such advantageous effects will be described successively in detail.

«2. Configuration»
<2-1. Configuration of Wireless Communication System>

Figure 2:
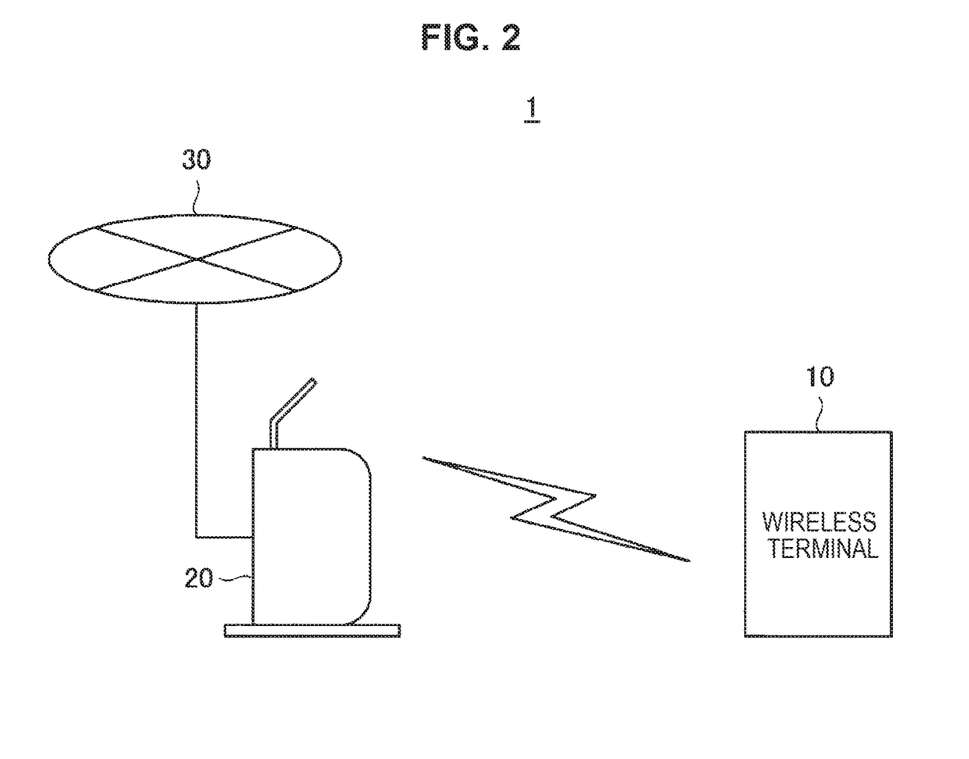
FIG. 2 is an explanatory diagram illustrating a configuration of a wireless communication system according to the embodiment.

FIG. 2 is an explanatory diagram illustrating a configuration of a wireless communication system according to the present embodiment. As illustrated in FIG. 2, the wireless communication system 1 according to the present embodiment includes a wireless terminal 10, an access point 20, and a communication network 30.

The wireless terminal 10 is a wireless device that conducts wireless communication with the access point 20, and may be a wireless LAN access point that conducts wireless communication in accordance with a wireless LAN standard. For example, the wireless terminal 10 may be a device such as a mobile phone, a smartphone, a tablet, or a notebook personal computer (PC). Note that an exemplary configuration of the wireless terminal 10 will be described later with reference to FIG. 3.

The access point 20 is a wireless device for interconnecting with other wireless devices and connecting to other networks. Additionally, the access point 20 may also include router functions that bridge and connect different networks to each other.

The access point 20 according to the present embodiment is connected to the wireless terminal 10, for example, and conducts wireless communication in accordance with a wireless LAN standard. The access point 20 is also connected to the communication network 30 described below.

The communication network 30 is a wired or wireless transmission channel on which information is transmitted from a device or system connected to the communication network 30. For example, the communication network 30 may encompass a public network such as the Internet, a telephone network, or a satellite communication network, various types of local area networks (LANs), including Ethernet (registered trademark), and wide area networks (WANs). Additionally, the communication network 30 may also encompass a dedicated network such as an Internet Protocol virtual private network (IP-VPN).

As described with reference to FIG. 1, in the wireless communication system 1 according to the present embodiment, the transmit power from the wireless terminal 10 to the access point 20 varies depending on the temperature. Hereinafter, an exemplary configuration of the wireless terminal 10 for realizing advantageous effects like the above will be described with reference to FIG. 3.

<2-2. Configuration of Wireless Terminal>

Figure 3:
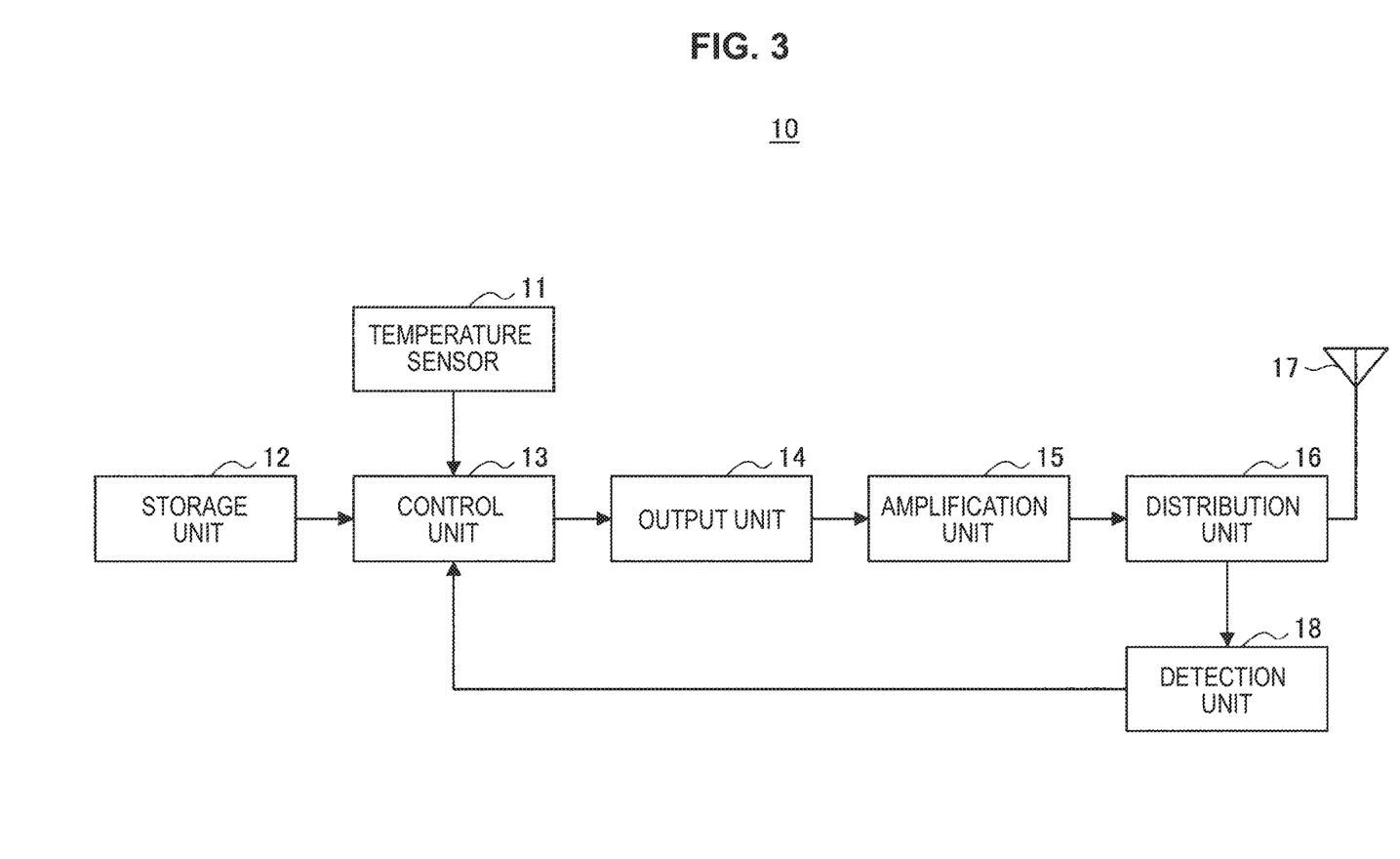
FIG. 3 is an explanatory diagram illustrating an exemplary configuration of a wireless terminal 10 according to the embodiment.

FIG. 3 is an explanatory diagram illustrating an exemplary configuration of the wireless terminal 10 according to the present embodiment. As illustrated in FIG. 3, the wireless terminal 10 according to the present embodiment is provided with a temperature sensor 11, a storage unit 12, a control unit 13, an output unit 14, an amplification unit 15, a distribution unit 16, a transmit antenna 17, and a detection unit 18.

Note that, regarding the configuration of the wireless terminal 10 according to the present embodiment, FIG. 3 primarily illustrates the functions for controlling the transmit power of the wireless terminal 10, while other parts of the configuration are omitted from illustration. For example, the wireless terminal 10 may also include various component not illustrated for conducting wireless communication, such as a receiving antenna and a circuit related to receiving, and a circuit related to processing data (signals).

The temperature sensor 11 is a sensor that acquires (measures) the temperature. The temperature acquired by the temperature sensor 11 is provided to the control unit 13. Note that the temperature sensor 11 may acquired the temperature on the outside of the housing of the wireless terminal 10, and may also acquire the temperature on the inside of the housing of the wireless terminal 10. If the temperature on the inside of the housing of the wireless terminal 10 is acquired, the temperature sensor 11 may be provided in close contact with a wireless LAN chip that realizes components such as the storage unit 12, the control unit 13, and the output unit 14 described later, for example.

The storage unit 12 stores information such as programs and parameters by which the control unit 13 described later functions.

For example, the storage unit 12 according to the present embodiment stores a temperature table associating information about temperature with information related to the saturation transmit power, which is the maximum transmit power that the wireless terminal 10 is able to output at the relevant temperature.

The temperature table may be generated in advance on the basis of measurement of the saturation transmit power with respect to the wireless terminal at multiple temperatures acquired by the temperature sensor, for example. Note that the information related to the saturation transmit power included in the temperature table may also be information enabling the control unit 13 to conduct transmit power control to output the saturation transmit power. For example, the information related to the saturation transmit power may be the saturation transmit power itself, parameters by which the control unit 13 controls the output unit 14 so that the wireless terminal 10 outputs at the saturation transmit power, or if the wireless terminal 10 has output at the saturation transmit power, a detected voltage generated by the detection unit 18 described later. Note that in the following, the information related to the saturation transmit power included in the temperature table will be described as being a detected voltage generated by the detection unit 18 when the wireless terminal 10 outputs at the saturation transmit power.

Additionally, the storage unit 12 according to the present embodiment includes a data rate table associating information about the transmit data rate of the wireless terminal 10 with information related to the power margin. The power margin according to the present embodiment is, for example, the difference between the maximum transmit power able to guarantee desired distortion performance with respect to the wireless terminal 10 (transmission device), and the saturation transmit power.

The data rate table may be generated in advance on the basis of measurement of the distortion performance with respect to the wireless terminal at multiple transmit data rates and transmit powers, for example. Note that the information related to the power margin included in the data rate table may also be information enabling the control unit 13 to conduct transmit power control to output the maximum transmit power able to guarantee the desired distortion performance by combining the information related to the power margin with the information related to the saturation transmit power described above. For example, the information related to the power margin may be the power margin itself, parameters corresponding to the power margin for control of the output unit 14 by the control unit 13, or a voltage corresponding to the power margin at the detected voltage generated by the detection unit 18. Note that in the following, the information related to the power margin included in the data rate table will be described as being a voltage corresponding to the power margin at the detected voltage generated by the detection unit 18.

The control unit 13 includes a transmit power control function that controls the transmit power of the wireless terminal 10 (transmission device) on the basis of the temperature acquired by the temperature sensor 11. For example, the control unit 13 may control the transmit power on the basis of a saturation transmit power corresponding to the temperature. According to such a configuration, more flexible transmit power control becomes possible compared to the case of communicating at a fixed transmit power over the entire temperature range.

In addition, the control unit 13 may control the transmit power further on the basis of the power margin corresponding to the transmit data rate of the wireless terminal 10 (transmission device). According to such a configuration, it becomes possible to communicate at a transmit power able to guarantee the desired distortion performance, for example. Note that the transmit data rate of the wireless terminal 10 (transmission device) may be preset, selected by the user, or specified on the basis of the communication conditions between the wireless terminal 10 and the access point 20.

In addition, the control unit 13 may also control the transmit power on the basis of the temperature table and the data rate table stored in the storage unit 12. Also, the control unit 13 according to the present embodiment may control the transmit power of the wireless terminal 10 by controlling the output unit 14 described later. For example, the control unit 13 may control the transmit power of the wireless terminal 10 by controlling the output unit 14 so that the detected voltage generated by the detection unit 18 becomes a target detected voltage. Information indicating a relationship between the detected voltage and control parameters for the output unit 14 may also be stored in the storage unit 12, for example.

In such a case, the control unit 13 references the temperature table, and acquires the detected voltage generated by the detection unit 18 when the wireless terminal 10 outputs the saturation transmit power corresponding to the current temperature acquired by the temperature sensor 11. Additionally, the control unit 13 references the data rate table, and acquires the voltage corresponding to the power margin corresponding to the current transmit data rate. Additionally, the control unit 13 specifies a target detected voltage corresponding to the maximum transmit power able to guarantee the desired distortion performance, on the basis of the detected voltage generated by the detection unit 18 when the wireless terminal 10 outputs the saturation transmit power, and the voltage corresponding to the power margin at the detected voltage.

According to such a configuration, the control unit 13 becomes able to specify the target detected voltage by referencing the temperature table and the data rate table. Consequently, for example, compared to the case of conducting feedback control of the transmit power on the basis of the detected voltage generated by the detection unit 18, according to such a configuration, it becomes possible to transmit at the desired transmit power more quickly.

As a result of the transmit power control by the control unit 13 described above, the transmit power of the wireless terminal 10 varies depending on the temperature. Hereinafter, FIGS. 4 and 5 will be referenced to describe a specific example of transmit power control by the control unit 13 according to the present embodiment while also giving a comparison to transmit power control according to the comparative technology.

Figure 4:
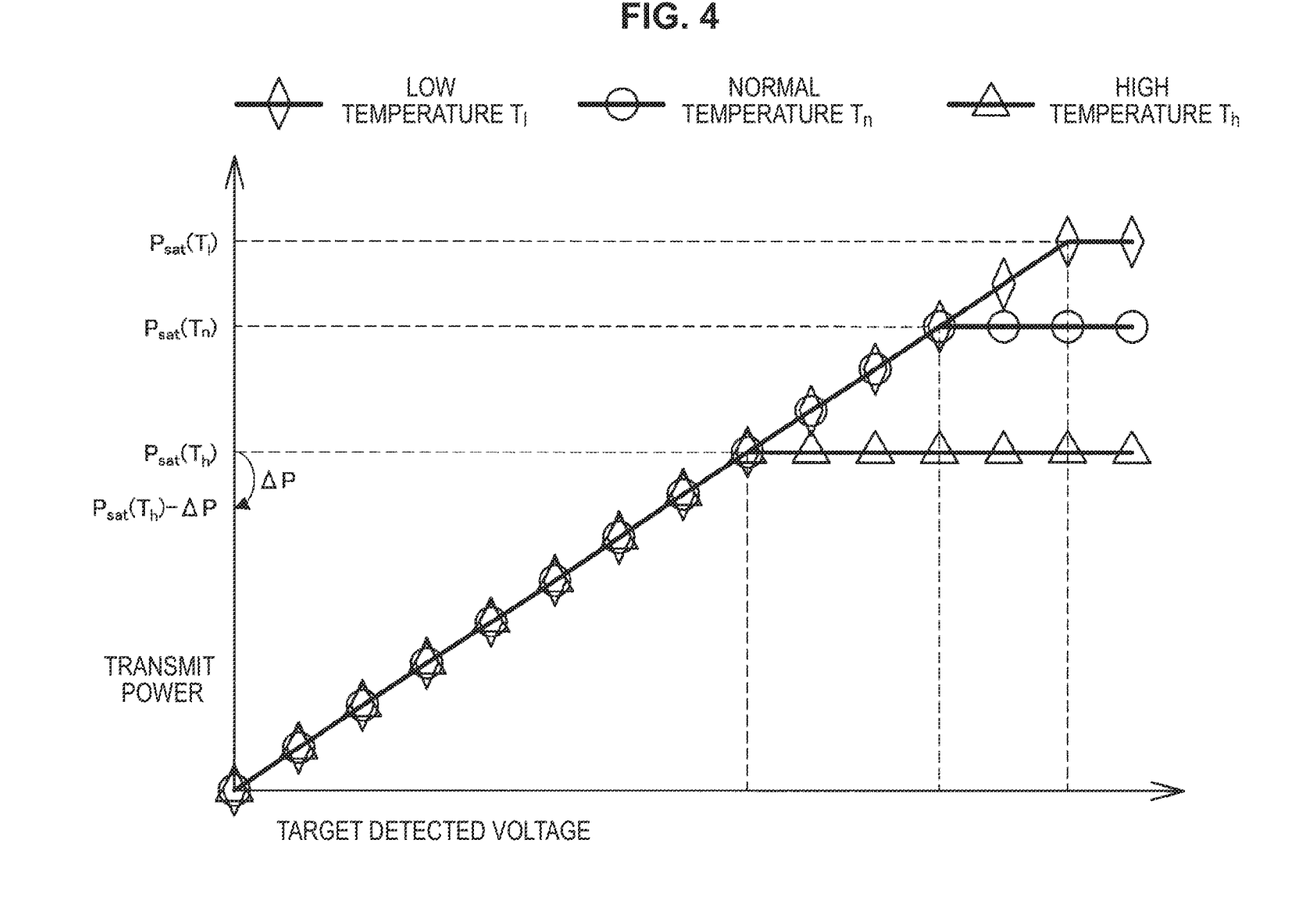
FIG. 4 is an explanatory diagram that schematically illustrates an example of transmit power control according to a comparative technology according to the embodiment.

FIG. 4 is an explanatory diagram that schematically illustrates an example of transmit power control according the comparative technology described with reference to FIG. 1. Also, FIG. 5 is an explanatory diagram that schematically illustrates an example of transmit power control by the control unit 13 according to the present embodiment.

Figure 5:
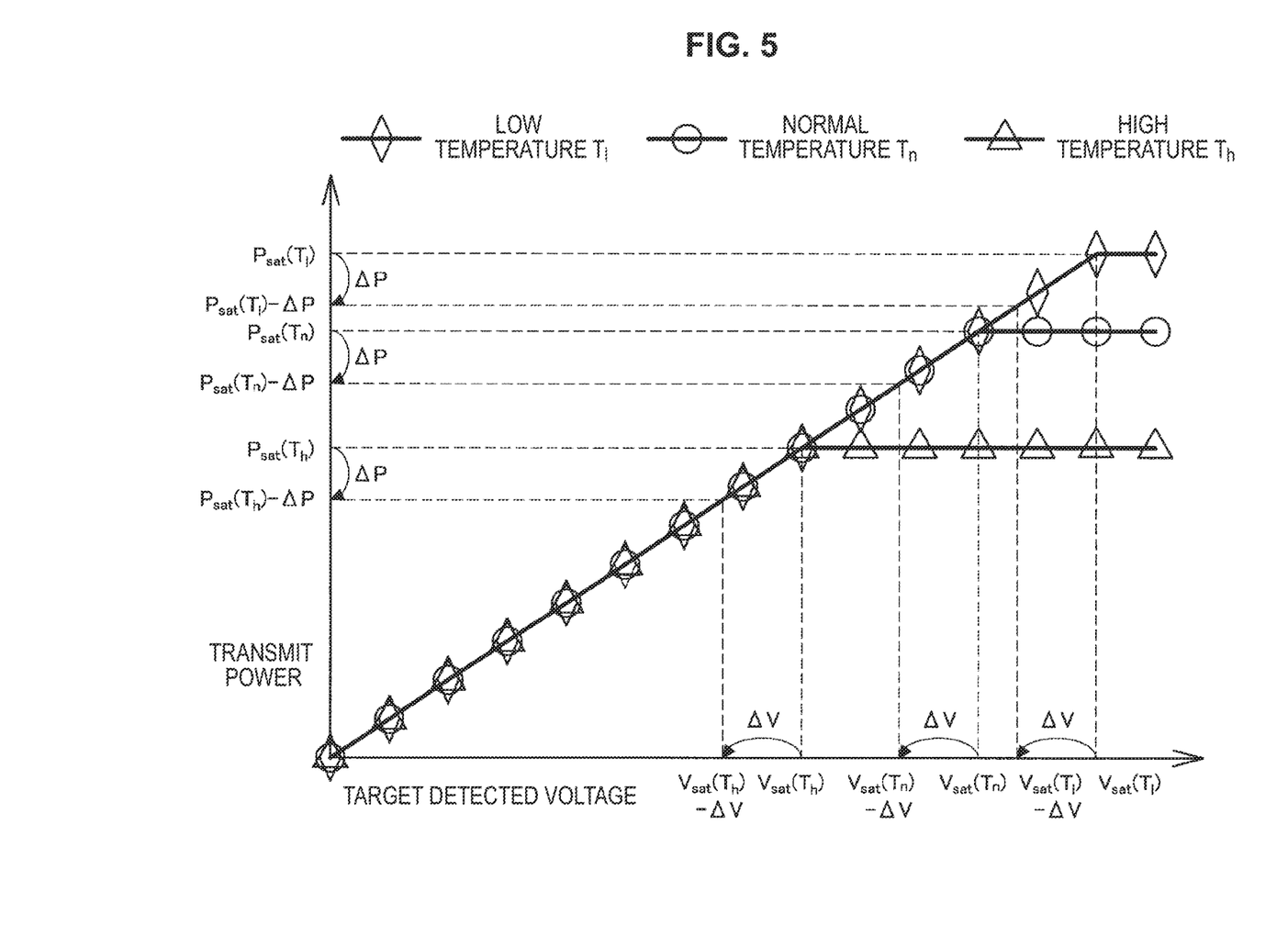
FIG. 5 is an explanatory diagram that schematically illustrates an example of transmit power control by a control unit 13 according to the embodiment.

As illustrated in FIGS. 4 and 5, even if the target detected voltage is increased in relation to the transmit power control, the transmit power that is actually output becomes saturated at a saturation transmit power that depends on the temperature. Also, as the temperature goes lower, the saturation transmit power becomes greater. For example, in the example illustrated in FIGS. 4 and 5, the saturation transmit powers are, in descending order of power, the saturation transmit power $P_{sat}(T_1)$ at a low temperature $T_1$, the saturation transmit power $P_{sat}(T_n)$ at a normal temperature $T_n$, and the saturation transmit power $P_{sat}(T_h)$ at a high temperature $T_h$.

Herein, according to the comparative technology as described earlier, communication is conducted at a transmit power able to guarantee the desired distortion performance at high temperatures over the entire temperature range. For example, as illustrated in FIG. 4, according to the comparative technology, over the entire temperature range, communication is conducted at a power $P_{sat}(T_h)-\Delta P$ obtained by subtracting the power margin $\Delta P$ from the saturation transmit power $P_{sat}(T_h)$.

On the other hand, the control unit 13 according to the present embodiment conducts the transmit power control described above, and thus the wireless terminal 10 according to the present embodiment conducts communication at the maximum transmit power able to guarantee the desired distortion performance at each temperature. For example, as illustrated in FIG. 5, according to the present embodiment, at the high temperature $T_h$, communication is conducted at the maximum transmit power $P_{sat}(T_h)-\Delta P$ able to guarantee the desired distortion performance, which is obtained by subtracting the power margin $\Delta P$ from the saturation transmit power $P_{sat}(T_h)$. Similarly, at the normal temperature $T_n$, communication is conducted at the maximum transmit power $P_{sat}(T_n)-\Delta P$ able to guarantee the desired distortion performance, which is obtained by subtracting the power margin $\Delta P$ from the saturation transmit power $P_{sat}(T_n)$. Similarly, at the low temperature $T_1$, communication is conducted at the maximum transmit power $P_{sat}(T_1)-\Delta P$ able to guarantee the desired distortion performance, which is obtained by subtracting the power margin $\Delta P$ from the saturation transmit power $P_{sat}(T_1)$.

Hereinafter, the case of the normal temperature $T_n$ will be described with regard to an example of the target detected voltage specified by the control unit 13 for realizing communication at the maximum transmit power able to guarantee the desired distortion performance at each temperature.

First, the control unit 13 references the temperature table read out from the storage unit 12, and specifies the detected voltage $V_{sat}(T_n)$ generated by the detection unit 18 when the wireless terminal 10 outputs the saturation transmit power $P_{sat}(T_n)$ corresponding to the current temperature $T_n$ acquired by the temperature sensor 11. Additionally, the control unit 13 references the data rate table read out from the storage unit 12, and acquires the voltage $\Delta V$ corresponding to the power margin $\Delta P$ corresponding to the current transmit data rate. Furthermore, the control unit 13 subtracts the voltage $\Delta V$ from the voltage $V_{sat}(T_n)$ to thereby specify the target detected voltage $V_{sat}(T_n)-\Delta V$. By having the control unit 13 conduct transmit power control on the basis of the target detected voltage $V_{sat}(T_n)-\Delta V$, communication is realized at the maximum transmit power $P_{sat}(T_n)-\Delta P$ able to guarantee the desired distortion performance at the normal temperature $T_n$.

Note that although the foregoing describes the case of a normal temperature $T_n$ as an example, the control unit 13 is able to specify a target detected voltage $V_{sat}(T_1)-\Delta V$ and a target detected voltage $V_{sat}(T_h)-\Delta V$ similarly for a low temperature $T_1$ and a high temperature $T_h$, respectively. Also, FIG. 5 illustrates an example for the case of temperature in the three stages of a high temperature $T_h$, a normal temperature $T_n$, and a low temperature $T_1$, but the number of stages of temperature according to the present embodiment is not limited to the above. For example, the number of stages of temperature according to the present embodiment may also be two, or more than three. Additionally, the number of stages of temperature according to the present embodiment may also be the number of stages of temperature included in the temperature table stored in the storage unit 12.

The above thus describes transmit power control by the control unit 13 according to the present embodiment. Next, the description will return to FIG. 3 and continue the description of an exemplary configuration of the wireless terminal 10 according to the present embodiment.

The output unit 14, under control by the control unit 13, outputs a radio frequency (RF) signal. For example, the output unit 14 may be realized by including a local oscillator and a preamp. In such a case, the control unit 13 may also control the gain with respect to the preamp.

The amplification unit 15 amplifies the RF signal output by the output unit 14. The amplification unit 15 may be realized by a power amplifier, for example.

The distribution unit 16 distributes the RF signal amplified by the amplification unit 15 to the transmit antenna 17 and the detection unit 18. The ratio of the power distributed by the distribution unit 16 (distribution ratio) may be predetermined. For example, the power distributed to the transmit antenna 17 may be greater than the power distributed to the detection unit 18. The distribution unit 16 may be realized by a directional coupler, for example.

The transmit antenna 17 converts the RF signal distributed by the distribution unit 16 into a radio wave, and transmits the radio wave to the access point 20 described with reference to FIG. 2.

The detection unit 18 converts the RF signal distributed by the distribution unit 16 into a direct-current voltage to generate a detected voltage. The detection unit 18 may be realized by a Schottky diode, for example. Note that the detected voltage generated by the detection unit 18 may also be fed back into the control unit 13.

The above thus describes an exemplary configuration of the wireless terminal 10 according to the present embodiment. Note that the storage unit 12, the control unit 13, and the output unit 14 described above may be realized by a wireless LAN chip (for example, an integrated circuit chip made up of a single die) that includes the functions of the storage unit 12, the control unit 13, and the output unit 14, and the wireless terminal 10 may be provided with such a wireless LAN chip.

«3. Operation»

Figure 6:
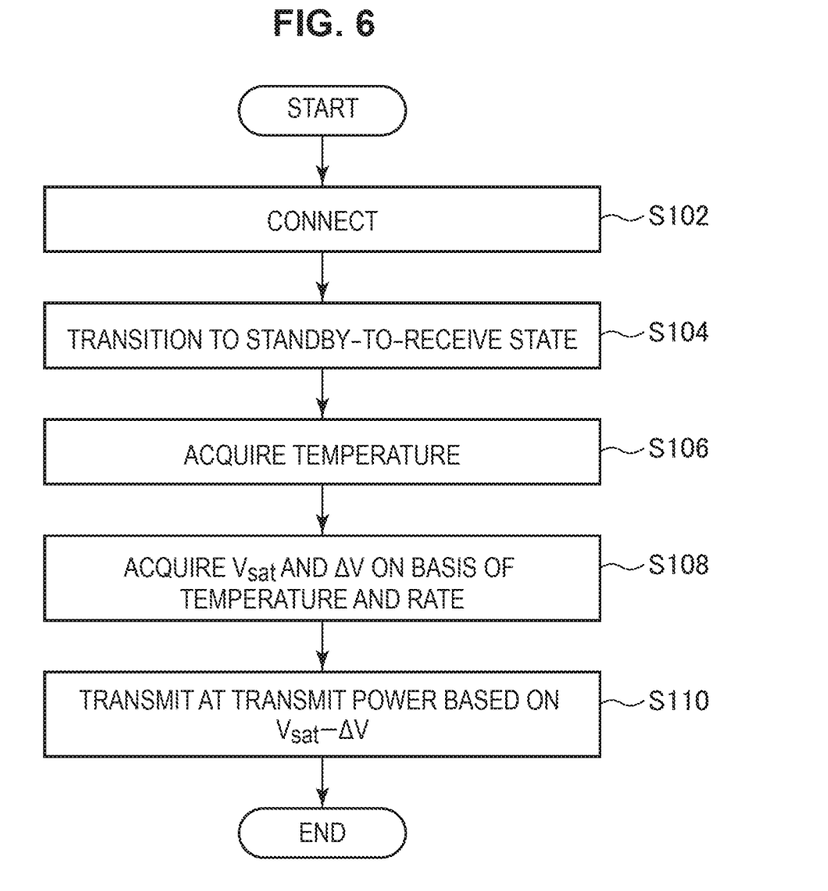
FIG. 6 is a flowchart illustrating exemplary operation of a wireless communication system 1 according to the embodiment.

The above thus describes an exemplary configuration of the present embodiment. Next, exemplary operation of the wireless communication system 1 according to the present embodiment will be described with reference to FIG. 6. FIG. 6 is a flowchart illustrating exemplary operation of the wireless communication system 1 according to the present embodiment.

First, the wireless terminal 10 connects to the access point 20 by wireless communication according to a wireless LAN standard (S102). Next, the access point 20 transitions to a standby-to-receive state (S104).

Meanwhile, the temperature sensor 11 of the wireless terminal 10 acquires the current temperature (S106). Next, the control unit 13 of the wireless terminal 10 references the temperature table and the data rate table stored in the storage unit 12 on the basis of the current temperature and the current transmit data rate, and acquires the detected voltage $V_{sat}$ generated when the wireless terminal 10 outputs the saturation transmit power, and the voltage $\Delta V$ corresponding to the power margin (S108).

By having the control unit 13 conduct transmit power control based on the target detected voltage $V_{sat}-\Delta V$, the wireless terminal 10 conducts transmission at the maximum transmit power able to guarantee the desired distortion performance (S110).

Note that the process from steps S104 to S110 described above may also be repeated.

«4. Modifications»

The foregoing thus describes an embodiment of the present disclosure. Hereinafter, several modifications of the present embodiment will be described. Note that the modifications described hereinafter may be applied to the present embodiment individually, or applied to the present embodiment in combination with each other. Also, each modification may be applied as a substitute for the configuration described in the present embodiment, or applied in addition to the configuration described in the present embodiment.

<4-1. Modification 1>

The foregoing describes an example in which the control unit 13 specifies a target detected voltage and conducts transmit power control on the basis of the target detected voltage, but the present technology is not limited to such an example.

For example, the control unit 13 may also conduct transmit power control on the basis of a target transmit power. In such a case, the temperature table stored in the storage unit 12 may include the saturation transmit power as the information related to the saturation transmit power. Additionally, the data rate table stored in the storage unit 12 may include the power margin as the information related to the power margin. Additionally, the control unit 13 may reference the temperature table and the data rate table on the basis of the temperature and the transmit data rate, acquire the saturation transmit power and the power margin, and specify the target transmit power by subtracting the power margin from the saturation transmit power. Also, in such a case, information indicating a relationship between the transmit power and control parameters for the output unit 14 may also be stored in the storage unit 12, for example.

<4-2. Modification 2>

In addition, the foregoing describes an example in which the wireless terminal 10 includes the function of acting as the transmission device, and the function of acting as the control device that controls the transmit power of the transmission device, but the present technology is not limited to such an example.

For example, the access point 20 may be provided with the functions of acting like the transmission device and the control device. Also, the storage unit and the control unit illustrated in FIG. 3 do not necessarily have to be provided inside the same housing as the other components illustrated in FIG. 3. In such a case, for example, the device provided with the control unit may act as the control device, and control the transmit power of a transmission device provided with components such as the amplification unit and the transmit antenna.

«5. Exemplary Hardware Configuration»

Figure 7:
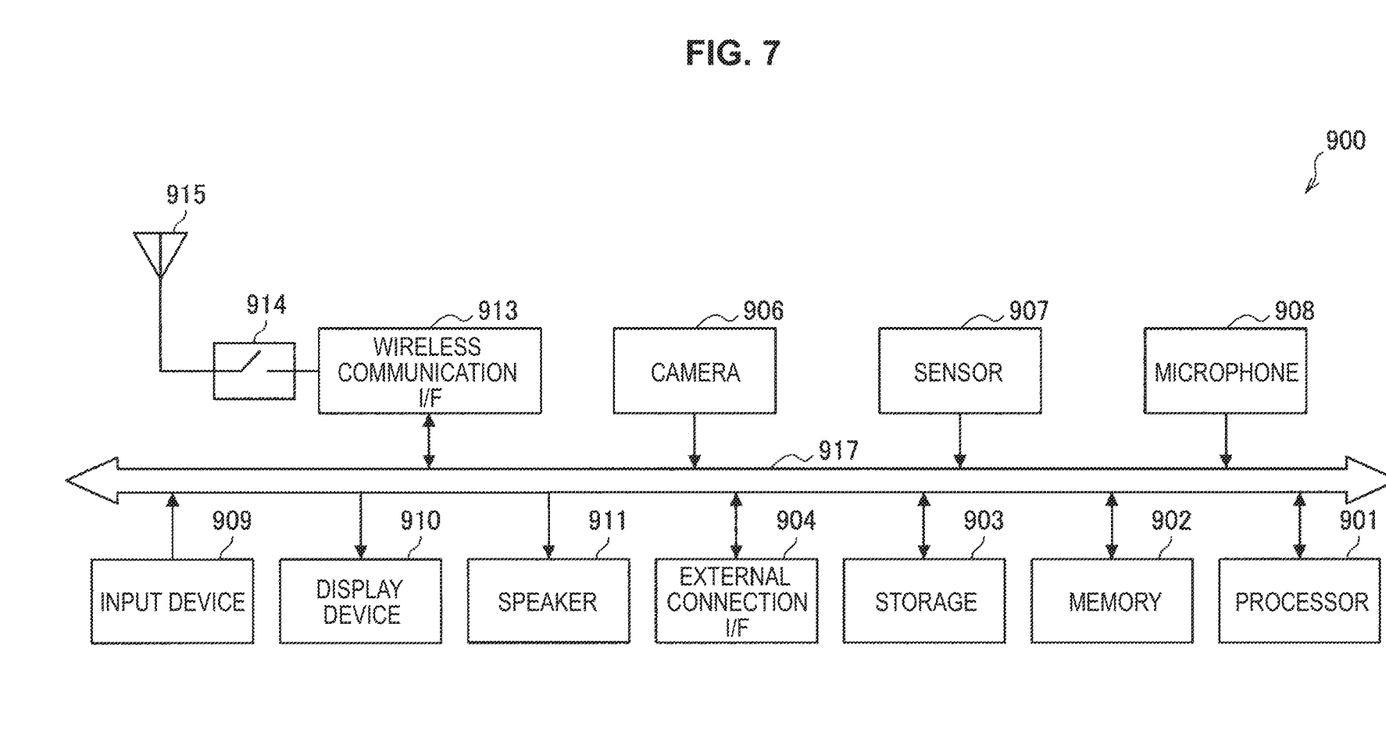
FIG. 7 is an explanatory diagram illustrating an exemplary hardware configuration.

The foregoing thus describes an embodiment of the present disclosure. Lastly, a hardware configuration of a wireless communication apparatus (control device) according to an embodiment of the present disclosure will be described with reference to FIG. 7. FIG. 7 is a block diagram illustrating an example of a hardware configuration of a wireless communication apparatus according to an embodiment of the present disclosure. Note that the wireless communication apparatus 900 illustrated in FIG. 7 may realize the wireless terminal 10, for example. Information processing by the wireless terminal 10 according to the present embodiment is realized by cooperative action between software, and the hardware described below.

As illustrated in FIG. 7, the wireless communication apparatus 900 is equipped with a processor 901, memory 902, storage 903, an external connection interface 904, a camera 906, a sensor 907, a microphone 908, an input device 909, a display device 910, a speaker 911, a wireless communication interface 913, an antenna switch 914, an antenna 915, and a bus 917.

The processor 901 may be, for example, a CPU (Central Processing Unit) or an SoC (System on Chip), and controls functions of an application layer and other layers of the wireless communication apparatus 900. The memory 902 includes a RAM (Random Access Memory) and a ROM (Read Only Memory), and stores programs executed by the processor 901 and data. The storage 903 can include a storage medium such as a semiconductor memory or a hard disk. The external connection interface 904 is an interface for connecting an externally attached device such as a memory card or a USB (Universal Serial Bus) device to the wireless communication apparatus 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the wireless communication apparatus 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the wireless communication apparatus 900. The speaker 911 converts audio signals output from the wireless communication apparatus 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency)

circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the wireless communication apparatus 900 may include a plurality of antennas (for example, antennas for a wireless LAN or antennas for a proximity wireless communication scheme, or the like), without being limited to the example of FIG. 7. In this case, the antenna switch 914 may be omitted from the configuration of the wireless communication apparatus 900.

The bus 917 connects the processor 901, the memory 902, the storage 903, the external connection interface 904, the camera 906, the sensor 907, the microphone 908, the input device 909, the display device 910, the speaker 911, and the wireless communication interface 913 to one another.

Note that the wireless communication apparatus 900 may operate as a wireless access point (software AP) as the processor 901 executes the function of an access point at an application level. In addition, the wireless communication interface 913 may have the function of a wireless access point.

Hereinbefore, an example of a hardware configuration capable of realizing the functions of the wireless communication apparatus 900 according to this embodiment is shown. The respective components may be realized using universal members, or may be realized by hardware specific to the functions of the respective components. Accordingly, according to a technical level at the time when the embodiments are executed, it is possible to appropriately change hardware configurations to be used.

In addition, a computer program for realizing each of the functions of the wireless communication apparatus 900 according to the present embodiment may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. The computer program may be delivered through a network, for example, without using the recording medium. In addition, the number of computers made to execute such a computer program is not particularly limited. For example, the computer program may be executed by multiple computers (such as multiple servers, for example) in conjunction with each other.

«6. CONCLUSION»

According to an embodiment of the present disclosure as described above, more flexible control of the transmit power is possible. Also, according to an embodiment of the present disclosure, at normal temperatures and at low temperatures, communication at a greater transmit power is possible while still being able to guarantee the desired distortion performance.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the foregoing embodiment describes an example of transmit power control with respect to wireless communication according to a wireless LAN standard, but the present technology is not limited to such an example. For example, the present technology is also applicable to transmit power control with respect to a transmission device that conducts wireless communication other than wireless communication according to a wireless LAN standard.

In addition, the respective steps in the foregoing embodiment do not have to be strictly processed in a time series following the sequence described as a flowchart. For example, the respective steps in a process of the foregoing embodiment may be processed in a sequence that differs from the sequence described herein as a flowchart, and furthermore may be processed in parallel.

Further, the effects described in this specification are merely illustrative or exemplified effects, and are not limitative. That is, with or in the place of the above effects, the technology according to an embodiment of the present disclosure may achieve other effects that are clear to those skilled in the art from the description of this specification.

Additionally, the present technology may also be configured as below.

(1) A control device, including:
    a control unit that controls a transmit power of a transmission device, on a basis of a temperature acquired by a sensor provided in the transmission device, in which the transmit power varies depending on the temperature.

(2) The control device according to (1), in which
    the control unit controls the transmit power on a basis of a saturation transmit power corresponding to the temperature.

(3) The control device according to (2), in which
    the control unit controls the transmit power further on a basis of a power margin corresponding to a transmit data rate of the transmission device.

(4) The control device according to (3), further including:
    a storage unit that stores a temperature table associating information about the temperature with information related to the saturation transmit power, and a data rate table associating information about the transmit data rate with information related to the power margin, in which
    the control unit controls the transmit power on a basis of the temperature table and the data rate table.

(5) The control device according to (3) or (4), in which
    the power margin is a difference between a maximum transmit power able to guarantee a desired distortion performance with respect to the transmission device, and the saturation transmit power.

(6) A control method, including:
    controlling a transmit power of a transmission device, on a basis of a temperature acquired by a sensor provided in the transmission device, in which the transmit power varies depending on the temperature.

(7) A program causing a computer to realize:
a function of controlling a transmit power of a transmission device on a basis of a temperature acquired by a sensor provided in the transmission device, so that the transmit power of the transmission device varies depending on the temperature.

What is claimed is:

1. A control device, comprising:
circuitry configured to
receive a temperature reading from a sensor that is in contact with transmission circuitry of a transmission device, and
control a transmit power of the transmission device on a basis of the temperature reading from the sensor,
wherein the circuitry varies the transmit power depending on the temperature reading,
wherein the circuitry controls the transmit power on a basis of a saturation transmit power corresponding to the temperature reading,
wherein the circuitry further controls the transmit power on a basis of a power margin corresponding to a transmit data rate of the transmission device, and
wherein the power margin is a difference between a maximum transmit power able to guarantee a desired distortion performance at the transmit data rate with respect to the transmission device, and the saturation transmit power.

2. The control device according to claim 1, wherein the circuitry is further configured to
store a temperature table associating information about the temperature reading with information related to the saturation transmit power, and a data rate table associating information about the transmit data rate with information related to the power margin, and
control the transmit power on a basis of the temperature table and the data rate able.

3. A control method, comprising:
receiving, with circuitry, a temperature reading from a sensor that is in contact with transmission circuitry of a transmission device; and
controlling, with the circuitry, a transmit power of the transmission device on a basis of the temperature reading acquired by the sensor,
wherein the transmit power is varied depending on the temperature reading,
wherein the controlling controls the transmit power on a basis of a saturation transmit power corresponding to the temperature reading,
wherein the controlling further controls the transmit power on a basis of a power margin corresponding to a transmit data rate of the transmission device, and
wherein the power margin is a difference between a maximum transmit power able to guarantee a desired distortion performance at the transmit data rate with respect to the transmission device, and the saturation transmit power.

4. A non-transitory computer-readable medium encoded with computer readable instructions that, when executed by processing circuitry, cause the processing circuitry to perform a method comprising:
receiving a temperature reading from a sensor that is in contact with transmission circuitry of a transmission device; and
controlling a transmit power of transmission device on a basis of temperature reading acquired by the sensor, the transmit power of the transmission device being varied depending on the temperature reading,
wherein the controlling controls the transmit power on a basis of a saturation transmit power corresponding to the temperature reading,
wherein the controlling further controls the transmit power on a basis of a power margin corresponding to a transmit data rate of the transmission device, and
wherein the power margin is a difference between a maximum transmit power able to guarantee a desired distortion performance at the transmit data rate with respect to the transmission device, and the saturation transmit power.

* * * * *